United States Patent [19]

Palmer

[11] Patent Number: 4,851,708
[45] Date of Patent: Jul. 25, 1989

[54] TIMESWITCHES

[75] Inventor: Malcolm W. T. Palmer, Grandborough, Nr. Rugby, England

[73] Assignee: Screening Consultants Limited, Jersey, Channel Islands

[21] Appl. No.: 173,761

[22] Filed: Mar. 28, 1988

[30] Foreign Application Priority Data

Apr. 4, 1987 [GB] United Kingdom ............... 8708098

[51] Int. Cl.⁴ ...................... H01H 43/00; G08B 5/00; G05B 11/01
[52] U.S. Cl. .................................... 307/141; 307/140; 340/825.22; 364/493; 364/145
[58] Field of Search ...................... 307/141, 140, 39; 364/143, 145, 493, 495; 340/310 A, 825.07, 825.22

[56] References Cited

U.S. PATENT DOCUMENTS

| | | | |
|---|---|---|---|
| 3,940,660 | 2/1976 | Edwards | 307/141 X |
| 4,293,915 | 10/1981 | Carpenter et al. | 307/39 X |
| 4,357,665 | 11/1982 | Korff | 307/39 X |
| 4,418,333 | 11/1983 | Schwarzbach et al. | 364/143 X |
| 4,573,127 | 2/1986 | Korff | 364/493 |
| 4,668,878 | 5/1987 | Wyss | 307/141 |
| 4,672,232 | 6/1987 | Schoen | 307/140 |
| 4,719,364 | 1/1988 | Pequet et al. | 307/141 |

FOREIGN PATENT DOCUMENTS 0193968 9/1986 European Pat. Off. .
2054908A 2/1981 United Kingdom .
2195475A 4/1988 United Kingdom .

*Primary Examiner*—William M. Shoop, Jr.
*Assistant Examiner*—Sharon D. Logan
*Attorney, Agent, or Firm*—Laff, Whitesel, Conte & Saret

[57] ABSTRACT

A programmable timeswitch comprises a microcontroller and a switching relay for controlling the supply of electricity to electrical apparatus in accordance with a predetermined 'yearly' program stored in an EPROM. The yearly program can include different daily programs for weekdays and weekends and includes different seasonal programs to take account of different demands for electricity at different times of the year. The timeswitch is programmed to switch automatically from one seasonal program to the next seasonal program on predetermined dates in the year and so does not have to be re-programmed at intervals throughout the year. The timeswitch may be used as part of a 'deferable load program' run by a utility in which a large number of timeswitches are supplied to different installations, the timeswitches having been programmed by a master console under the sole control of the utility.

14 Claims, 3 Drawing Sheets

TIMESWITCHES

This invention relates to timeswitches of the kind which are adapted to control the supply of electricity to electrical apparatus in accordance with a predetermined programme.

Utilities which supply electricity to the public for industrial and domestic use have to cope with different load demands at different times of the day and week. For instance, more electricity is required for industrial purposes during weekday working hours, "peak periods", and less electricity needs to be supplied at "off peak periods" such as at night time and during the weekends. The daily demands of electricity in most countries also differ considerably at different times of the year because of large seasonal variations in climatic conditions. In the summer, for instance, the peak periods may coincide with the hottest times of day when a large amount of electricity is consumed by air conditioning systems, whereas in the winter there is commonly a greater demand for electricity for central heating systems at different times of the day.

Previously, there have been periods when the demand for electricity has exceeded the capability of the utilities to supply the required amounts, and the utilities often have to reduce or even cut off the supplies to some consumers, such as domestic consumers, in order to cope with unexpected periods of increased demand.

Consequently, electricity utilities are being encouraged to introduce 'deferable load programmes' in which not only is the supply of electricity for non-essential uses reduced or cut off during peak periods at predetermined times that are known to the consumer but also the cost to the consumer of electricity for uses such as water heating is reduced during off peak periods, for instance at night. Timeswitches which are programmed to control the supply of electricity in accordance with the time of day are known and these may be supplied with electricity meters as part of a 'deferable load programme' run by a utility. A disadvantage of daily programmable timeswitches, however, is that they have to be re-programmed at intervals throughout the year to take account of different seasonal load requirements. It can be a laborious task to re-programme the timeswitches and it is important to prevent unauthorised access to the timeswitches. It is an aim of the present invention to overcome these disadvantages.

According to a first aspect of the present invention a programmable timeswitch is provided which is programmed with a predetermined yearly programme for the supply of electricity to electrical apparatus during a calendar year and which is arranged to control the supply of electricity to the apparatus in accordance with said predetermined yearly programme.

The yearly programme conveniently includes different predetermined seasonal programmes, for instance summer and winter programmes, and preferably spring and autumn programmes as well, and the timeswitch is programmed to switch automatically from one seasonal programme to the next on predetermined dates in the calendar year. This provides a considerable advantage over conventional daily programmable timeswitches which have to be re-programmed at the end of each season. The yearly programme of the timeswitch may also automatically take account of changes in the clock such as changeovers between Standard Time and Summer Time or Standard Time and Daylight Saving Time.

Preferably the timeswitch is programmed to control the supply of electricity on each individual day of the year in accordance with one of a number of daily programmes, and the appropriate daily programme for a particular day is determined in accordance with the predetermined yearly programme. Thus the timeswitch when programmed in this manner is able to take account of predictable changes in the daily load pattern, for instance when there is no industrial load at weekends and on public holidays.

It is to be appreciated that the term "yearly programme" as used herein refers broadly to a programme that is arranged to change on predetermined dates in the calendar year, and that the yearly programme is not necessarily restricted to one single calendar year. Thus the yearly programme of the timeswitch may run for more than one year since accurate timekeeping is possible and knowledge of the times of the seasons and the dates of weekends, public holidays etc. is available for several years into the future.

The switching off and on and/or the increase or decrease of the supply of electricity is preferably achieved by switching means which may be controlled by control means in the form of a microprocessor which is connected to memory means for storing said predetermined yearly programme, the control means being responsive to signals from a timekeeper within the timeswitch. It is generally sufficient for the timekeeper to be accurate to within ten minutes over a twelve month period although if a crystal oscillator controlled clock is used as the timekeeper an accuracy of less than a minute over a twelve month period can be obtained.

The timeswitch may be powered by the main electricity supply controlled by the timeswitch, although a separate power supply or battery may also be provided which is arranged to power the timeswitch on occasions when the main electricity supply fails. Preferably, the separate power supply is able to permit at least 7 days of carryover in periods of power failure of the main electricity supply. A re-chargeable Nickel-Cadmium battery that is constantly trickle charged would be sufficient for this purpose. An on/off switch may be provided to isolate the separate power supply during storage or transit. A warning means, for example a light-emitting diode, may be provided for indicating failure of the power supply to the timeswitch and/or for indicating that the timeswitch does not contain a valid programme.

The timeswitch may include display means, such as a liquid crystal display, which can be arranged to display information on the existing state of the timeswitch, for instance the day, date and time, and the rate at which electricity is being supplied at that time.

The timeswitch as described above is primarily intended to be used for controlling the supply of electricity to domestic electrical appliances which require a relatively large amount of power and which are required for use during only part of the day, for instance storage heaters, immersion heaters and cookers. A number of timeswitches may be provided by a utility to consumers as part of a deferable load programme in which the timeswitches are programmed to reduce or cut off the supply of electricity at predetermined times during peak periods and increase or switch on the supply at other predetermined times during off peak periods.

When a large number of timeswitches are used to control a corresponding number of electrical supplies from a central source it is desirable to avoid large transient currents which are caused by the switching on or off of a large number of supplies at the same time. This may be overcome by programming the timeswitches so that the switch on/off times are staggered within a switching period of up to fifteen minutes in duration.

When used as part of a deferable load programme run by a utility, the or each timeswitch may include or be used in conjunction with a metering means under the control of the utility and which meters the amount of electricity supplied to a consumer via the timeswitch.

In one preferred form the timeswitch is adapted to be incorporated within a standard plug-in type meter assembly, such as a NEMA adaptor as is used by utility companies in the U.S.A., and which is usually located outside the buildings to which electricity is supplied. The timeswitch itself may be programmed to store and record 'meter' information on the amount of electricity supplied through it to a consumer, and it may include connections which enable it to transmit this information to an outside source. These connections may also be used for programming and re-programming the timeswitch, although it is envisaged that once a yearly programme has been entered into the timeswitch, subsequent re-programming should not be necessary for a substantial period of time apart from under exceptional circumstances. Preferably, the timeswitch connections are coded so that the timeswitch can only transmit and/or receive information to or from a console having complementary coded connections. In this manner, only an authorised person who has the appropriate console, for instance an employee of the utility company, can receive meter information from the timeswitch and/or can enter programmes into the timeswitch.

The utility company may operate a system in which they have control of a master console which preferably is the only means by which the timeswitch or timeswitches can be programmed. The timeswitches may be programmed, in such a system, directly from the master console by means of the coded connections. Alternatively, or additionally, at least one remote console may be provided which is arranged to transmit to the timeswitch the programme that it has received from the master console.

It is possible that a utility might operate a system using such a master console with programmable timeswitches which are not necessarily programmed in accordance with a yearly programme. Thus, according to a second aspect of the present invention there is provided a system for controlling the supply of electricity to electrical apparatus at a number of installations comprising a number of programmable timeswitches, each of which is programmed to control the supply of electricity to the electrical apparatus at an individual electrical installation in accordance with a predetermined programme which can only be entered into the timeswitch from a master console.

The predetermined programme may be entered into the timeswitch from the master console either directly or indirectly via a remote console. The remote console may include a facility which enables it to receive information recorded by the timeswitch, for instance, 'meter' information on the amount of electricity supplied through the timeswitch.

Preferably the connections of the timeswitch and the console or consoles are optical connections. These provide several advantages over direct electrical connections. They provide additional security as it is not possible for the programme and any recorded information in the timeswitch to be altered by an unauthorised person; they enable a sealed surface to be provided which prevents the ingress of dirt and liquids; and they prevent objects being inserted which might damage contacts within the timeswitch and which could draw off electric power.

The present invention will now be described, by way of example only, with reference to the accompanying drawings in which:-

Figure 1:
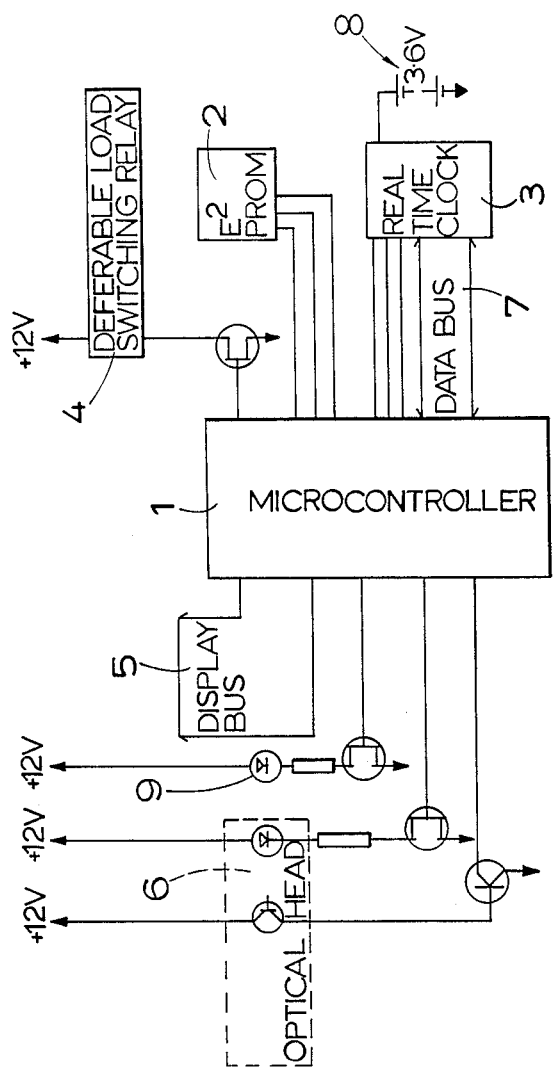
FIG. 1 is a schematic block diagram of a programmable timeswitch in accordance with the first aspect of the invention.

The timeswitch of FIG. 1 comprises a microcontroller 1, an erasable programmable read only memory (EPROM) 2, a timekeeper or real time clock 3, a deferable load switching relay 4, a display bus 5 and optical connections 6.

The microcontroller 1 of the timeswitch of FIG. 1 may be used to control the supply of electricity to electrical apparatus connected to the switching relay 4 in accordance with a predetermined yearly programme which has been programmed into the EPROM 2. The microcontroller 1 is connected to the clock 3 by means of a data bus 7 and is arranged to control the switching relay 4 to switch the electrical apparatus on and off at different times of the day, week and year which are determined by the yearly programme of the EPROM 2.

The real time clock 3 is connected to a nickel cadmium battery 8 which powers the timeswitch during periods of failure of the main electricity supply. A light emitting diode 9 is connected to the microcontroller 1 and may be arranged to indicate when the timeswitch is out of operation, for instance when the EPROM 2 does not contain a valid programme or when the battery 8 fails. The components of the timeswitch are encapsulated within a housing (not shown in FIG. 1) and are designed to withstand temperatures within a range from $-30°$ C. to $+60°$ C.

Figure 2:
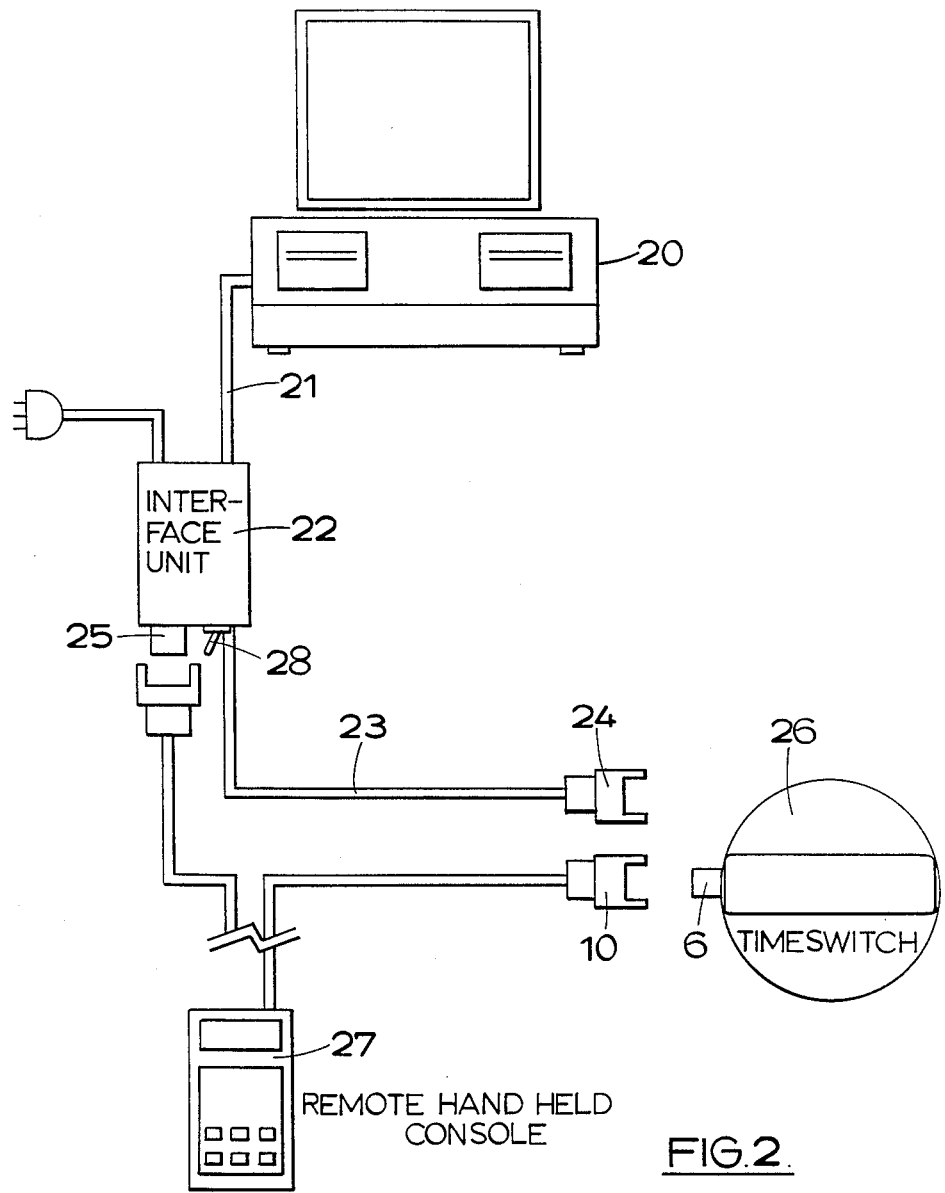
FIG. 2 is a schematic diagram of a system in accordance with the second aspect of the invention.
Figure 3:
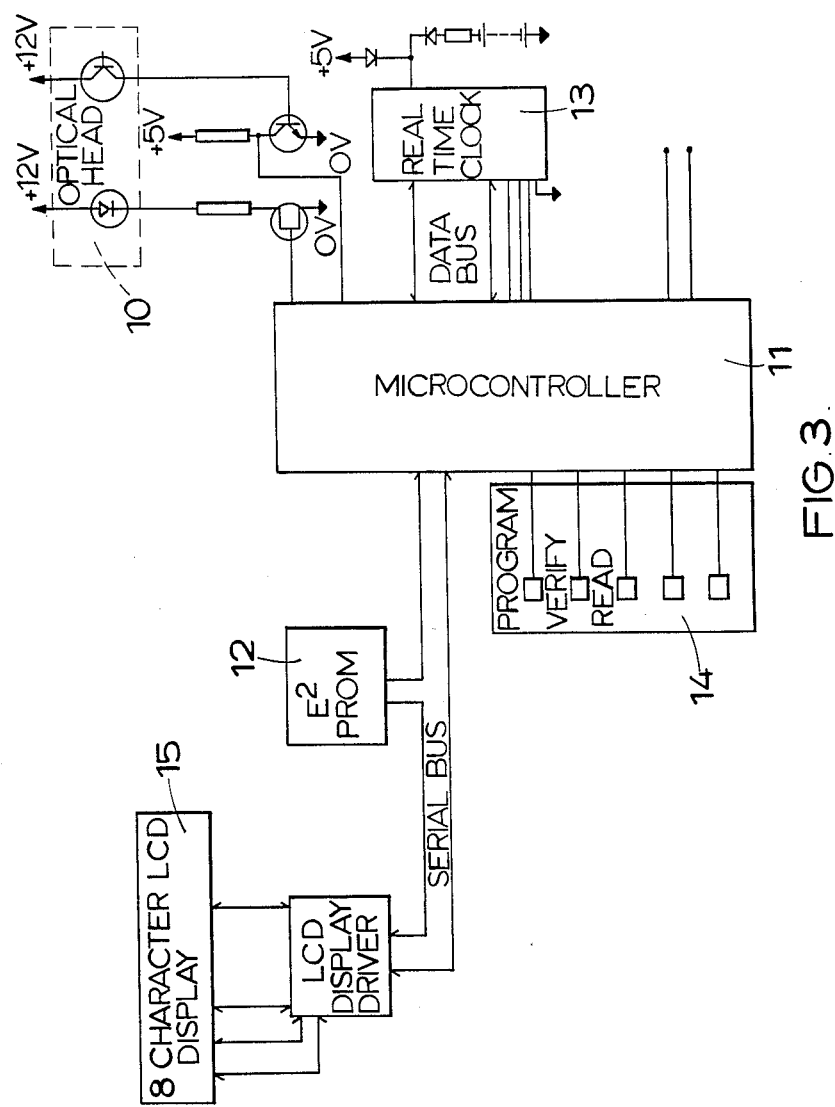
FIG. 3 is a schematic block diagram of a console which can be used with the timeswitch of FIG. 1 in the system of FIG. 2.

The display bus 5 may include a liquid crystal display for displaying information on the current state of the timeswitch. The optical connections 6 are connected to the microcontroller 1 and enable a predetermined yearly programme to be entered into the EPROM 2 from a master console via complementary optical connections. In addition the connections 6 may be arranged to transmit information to a remote console, such as shown in FIGS. 2 and 3, which also has complementary optical connections 10. The remote console may also be used for programming or reprogramming the EPROM 2.

The timeswitch of FIG. 1 may be incorporated in the system shown in FIG. 2 which comprises a master console 20 connected by a lead 21 to an interface unit 22 which in turn has connections 23, 24 and 25 which enable it to be connected either to a timeswitch 26 or to at least one remote hand held console 27.

The master console 20 may be any type of commercially available personal computer (PC) console and preferably is under the sole control of a utility company operating a system in which a plurality of programmable timeswitches are supplied to different installations and each timeswitch 26 is programmed from the master console 20 to control the supply of electricity to electrical apparatus at its individual installation in accordance with a yearly programme determined by the utility company.

There are preferably four elements to the yearly programme entered into each timeswitch from the master console, these being:

1. Start/End Season;
2. Monday/Friday programme;
3. Saturday/Sunday programme; and
4. Day Omission.

By using each of these four elements a programme of switching dates and times can be entered into the EPROM 2 of each timeswitch 26 enabling each timeswitch to control the supply of electricity at its installation throughout several seasons in accordance with different daily programmes for weekdays and weekends, with the timeswitch being able to swtich automatically from one seasonal programme to another on predetermined dates of the calendar year at the start and end of each season. Preferably, at least four different ON/OFF switching times per day per season are provided when the supply of electricity may be reduced or increased, or cut-off or switched on.

The "Day Omission" element of the programme enables a different daily programme for holidays to be entered into the timeswitch, and also enables the timeswitch to take account of leap years, for instance by omitting February 29th in three out of every four years.

As shown in FIG. 2 each timeswitch may be programmed directly from the master console 20 by plugging the optical connector 6 of the timeswitch 26 into a complementary connector 24 leading from the interface unit 22. Alternatively, the yearly programme for the timeswitch 26 may be first entered into the remote hand-held console 27 and then from the remote console 27 to the timeswitch 26 via a similar optical connection 10. The interface unit 22 has a switch 28 for switching between the two modes of programming the timeswitch.

The remote console of FIG. 2 is shown in more detail in FIG. 3 and comprises a microcontroller 11, an EPROM 12, a real time clock 13, a panel of switches 14, a liquid crystal display (LCD) 15 and optical connections 10. A programme, such as a yearly programme for controlling an electrical supply, may be entered into the EPROM 12 from a master console by means of the optical connections 10 and re-transmitted to a timeswitch of the kind shown in FIG. 1 by the optical connections 10. The panel of switches 14 may be used to read and verify information about the programme entered into the EPROM 12, the information being displayed by the LCD 15.

When the console of FIG. 3 is connected to the timeswitch of FIG. 1, the panel of switches 14 and the LCD 15 may be used to read and verify information about the yearly programme entered into the EPROM 2 of the timeswitch, and also to make changes to that programme if it needs to be modified. Furthermore, the timeswitch may be programmed to record data on the amount of electricity supplied through it during the periods when different charging rates are applicable and this data may be read by the remote console and displayed on its LCD 15. In this manner the remote console can 'audit' the information recorded by a standard meter at the installation, verifying whether or not the meter has been tampered with. The remote console also provides an easily read form of data base for the collation and transmission of data to the head office of the utility company controlling the timeswitches.

I claim:

1. A system for controlling the supply of electricity to electrical apparatus at a plurality of installations comprising a master console and a plurality of programmable timeswitches each of which is associated with an individual one of said installations, each of said timeswitches comprising a timekeeper, programmable memory means for storing a predetermined yearly programme for the supply of electricity to electrical apparatus during a calendar year, coded connections through which said programme can be entered into said memory means, switching means capable of varying the supply of electricity to electrical apparatus and control means which, in response to signals from said timekeeper, is operable to control said switching means to vary the supply of electricity to the apparatus in accordance with said predetermined yearly programme, and the memory means of each of said timeswitches having been programmed from said master console via said coded connections with said predetermined yearly programme and being arranged to control the supply of electricity to the electrical apparatus at each of said individual installations in accordance with said predetermined yearly programme.

2. A system according to claim 1 wherein said memory means of each of said timeswitches is programmed to include at least two different seasonal programmes and the timeswitch is operable to switch automatically from one seasonal programme to the next seasonal programme on a predetermined date or day in the or each calendar year.

3. A timeswitch according to claim 1 wherein said memory means includes a plurality of different daily programmes, the daily programme for a particular day of the calendar year being determined in accordance with said predetermined yearly programme.

4. A system according to claim 3 wherein there are different daily programmes for weekdays and for days at weekends.

5. A system according to claim 3 wherein a different daily programme is provided for public holidays according to said predetermined yearly programme.

6. A timeswitch according to claim 1 which has optical connections through which the predetermined yearly programme is entered into said memory means of the timeswitch.

7. A system for controlling the supply of electricity to electrical apparatus at a plurality of installations comprising a master console and a plurality of programmable timeswitches each of which is associated with an individual one of said installations, said timeswitches having been programmed from said master console with a predetermined programme for the supply of electricity to the electrical apparatus and being arranged to control the supply of electricity at each of said individual installations in accordance with said predetermined programme, wherein said timeswitches are programmed to record information on the electricity supplied through them.

8. A system according to claim 1 wherein said plurality of timeswitches are programmed in accordance with different predetermined programmes which have slightly different switching times.

9. A system according to claim 12 wherein said timeswitches are programmed to record information on the electricity supplied through them.

10. A system according to claim 7 wherein remote consoles which can communicate with said timeswitches are provided for receiving information from said timeswitches.

11. A system according to claim 15 wherein said remote console and said timeswitches have complementary coded connections.

12. A system according to claim 16 wherein said coded connections of said remote console and of said timeswitches are optical connections.

13. A system for controlling the supply of electricity to electrical apparatus at a plurality of installations comprising a master console and a plurality of programmable timeswitches each of which is associated with an individual one of said installations, said timeswitches having been programmed from said master console with a predetermined programme for the supply of electricity to the electrical apparatus and being arranged to control the supply of electricity at each of said individual installations in accordance with said predetermined programme, said timeswitches being adapted to be programmed or re-programmed indirectly from said master console by remote consoles which have connections compatible with said master console and with said timeswitches, and said compatible connections of said remote console and of said timeswitches being complementary coded connections.

14. A system according to claim 13 wherein said coded connections of said remote console and of said timeswitches are optical connections.

* * * * *